United States Patent [19]
Ballarino

[11] Patent Number: 6,000,172
[45] Date of Patent: Dec. 14, 1999

[54] PLANT HOLDER

[76] Inventor: Ottavio Ballarino, 8109 Kipling Avenue, Suite No. 1, Woodbridge, Ontario, Canada, L4L 2A2

[21] Appl. No.: 09/020,810

[22] Filed: Feb. 9, 1998

[30] Foreign Application Priority Data

Feb. 10, 1997 [CA] Canada ................................. 2197151

[51] Int. Cl.⁶ .............................. A01G 9/12; A01G 17/10
[52] U.S. Cl. ................................................................. 47/47
[58] Field of Search ..................................... 47/44, 46, 47

[56] References Cited

U.S. PATENT DOCUMENTS

| | | |
|---|---|---|
| D. 261,853 | 11/1981 | Gigante et al. . |
| 3,266,778 | 8/1966 | Wogerbauer . |
| 3,793,771 | 2/1974 | Slaughter . |
| 4,175,883 | 11/1979 | Lemelson . |
| 4,250,666 | 2/1981 | Rakestraw . |
| 4,519,162 | 5/1985 | Stuckey . |
| 4,642,940 | 2/1987 | Ettema et al. . |
| 4,677,788 | 7/1987 | Mastandrea . |
| 4,750,293 | 6/1988 | Dyke . |
| 4,841,670 | 6/1989 | Bitter . |
| 4,860,489 | 8/1989 | Bork et al. . |
| 4,881,342 | 11/1989 | Ferguson . |
| 5,249,390 | 10/1993 | Ankur Purohit . |
| 5,276,996 | 1/1994 | Lee . |
| 5,341,593 | 8/1994 | Foreman . |
| 5,357,710 | 10/1994 | Dulik . |
| 5,440,834 | 8/1995 | Kleinert . |

FOREIGN PATENT DOCUMENTS

| | | |
|---|---|---|
| 967750 | 5/1975 | Canada . |
| 1135509 | 11/1982 | Canada . |
| 2096865 | 11/1994 | Canada . |
| 2121169 | 10/1995 | Canada . |
| 2123975 | 11/1995 | Canada . |
| 1094519 | 12/1960 | Germany ................................. 47/46 R |
| 36 22 741 A1 | 1/1988 | Germany . |

OTHER PUBLICATIONS

Patent Abstracts of Japan vol. 096, No. 005, May 31, 1996 & JP 08 009789 A (Sasaki Seisakusho: KK), Jan. 16, 1996 *abstract*.

*Primary Examiner*—Peter M. Poon
*Assistant Examiner*—Francis T. Palo, Jr.
*Attorney, Agent, or Firm*—Bereskin & Parr

[57] ABSTRACT

This invention relates to an improved plant holder for use in a garden for supporting plants and vines as they grow and mature. The plant holder comprises a plurality of identical posts which may be driven into the ground by means of pointed ends. Each post has a plurality of hooks in pairs at different heights along the post. Further, between the posts rods are provided that clip into the hooks to lie in a horizontal plane at each of the different levels of the hooks. Since the hooks are paired on either side of the posts at different levels then a pair of rods may also be found at the corresponding levels. Each pair of rods is connected by C-clips which snap over the rods. A plant, such as a tomato plant, may be supported by this structure by driving the posts on either side of the plant, assembling the rods into the hooks on either sides of the plant stems, then applying the clips to secure the rods into position. Further, the clips are sufficiently spaced on the rods allowing a branch of the plant to be drawn through an opening in the clips for further support of the branches.

5 Claims, 3 Drawing Sheets

PLANT HOLDER

BACKGROUND OF THE INVENTION a) Field of Art

This invention relates to an improved plant holder for use in a garden for supporting plants and vines as they grow and mature.

b) Prior Art

Many garden variety plants, particularly those that bear fruits or vegetables, require support to maintain their produce off the ground as it grows and ripens, for example, tomato plants, beans, peas, cucumbers and other vegetables that grow on vines or weak stemmed plants. Many prior art devices have been developed to deal with this problem, each providing different structures with certain advantages and disadvantages. Examples of prior art devices are found in the following patents.

Canadian Patent No. 1,135,509 relates to a device for supporting tomato plants or the like, comprising a plurality of stakes which may be driven into the ground, and a series of disks fixed in a tiered arrangement on the stakes. Each disk has an opening to permit the plant to grow upwards through the disk to be supported therebelow by the disk.

Canadian Patent No. 967,750 describes a clip which may be used to attach a plant such as a tomato plant to a string suspended above the plant and thereby maintain it in an upright position.

Canadian Patent Application No. 2,123,975 relates to a bendable clip which may be fastened about a plant and over a post to maintain the plant in an upright position.

Canadian Patent Application No. 2,121,169 relates to a device for propping a plant by means of a combination of clips and an extension rod that fits onto the side of a pot.

Canadian Patent Application No. 2,096,865 discloses a tiered device comprising hoops or bowls and ball-like structures suspended on a rod to support a plant.

U.S. Pat. No. 5,276,996 relates to spiral structures which may be fixed in the ground and to clips adapted to hold a plant to the spiral structure as the plant grows.

U.S. Pat. No. 4,750,293 discloses a rod and flexible band-like clip member.

U.S. Design Pat. No. 261,853 discloses a rod having an arrow-shaped bottom with C-clips on its sides for clamping a plant to the rod.

U.S. Pat. No. 5,341,593 discloses a stake to support a large tomato plant with a shading mechanism.

U.S. Pat. No. 4,881,342 discloses hook and eye mechanisms which may be used to clip plants to a supporting rod.

U.S. Pat. No. 5,440,834 discloses a plant supporting ring and fastening device for use with a trilobal rod.

U.S. Pat. No. 4,860,489 discloses a spiral ring device clipped to a plurality of rods to support a vegetable plant such as a tomato plant.

U.S. Pat. No. 4,841,670 discloses a combination of supporting rings and a plurality of rods comprising a structure to support a tomato plant.

U.S. Pat. No. 5,249,390 discloses a trellis apparatus of identical L-shaped pieces which connect together to form a supporting structure.

U.S. Pat. No. 4,250,666 discloses a tiered series of trays or shelves on a central support for planting.

U.S. Pat. No. 3,793,771 discloses a pair of inverted U-shaped members with a mesh which may be used to support adjoining plants in a garden.

U.S. Pat. No. 4,519,162 discloses a ring structure to fit into a channel of a vertical rod for supporting plants within the rings.

U.S. Pat. No. 4,677,788 discloses a tomato plant support comprising a rod having a series of rings fitted about.

U.S. Pat. No. 5,357,710 discloses a combination of a trellis and a plant watering system.

SUMMARY OF THE INVENTION

The plant holder of this invention comprises in combination a plurality of identical posts, each said post having a pointed end to facilitate its being driven into the ground to stand upright and having a plurality of pairs of hooks spaced apart at different levels of the post with one hook of every pair on a first side of the post and with another hook of every pair on an opposing second side of the post; a plurality of rods of sufficient size to lie in the hooks and to span between adjacent posts, each rod fitting into a plurality of hooks at the same level of and on either the first side of or the opposing second side of adjacent posts, to lie between upright posts in horizontal parallel pairs of rods at each level of pairs of hooks; and a plurality of clips to connect adjacent pairs of parallel rods.

A plant such as a tomato plant may be supported by the structure by driving the posts on either side of the plant, assembling the rods into the hooks on either side of the plant stem and applying the clips to complete the assembly. The clips are sufficiently spaced from the rods that it is possible to draw a branch of the plant through the opening of the clip for further support of the branches. As the plant grows further rods may be added to the higher tiers for additional support.

In one embodiment, described hereafter, one of the rods is replaced by a water line having spaced holes to permit the plants to be sprayed from time to time as they are growing.

DESCRIPTION OF THE FIGURES

In the figures which illustrate the preferred embodiments of this invention.

DESCRIPTION OF THE PREFERRED EMBODIMENTS

Figure 1:
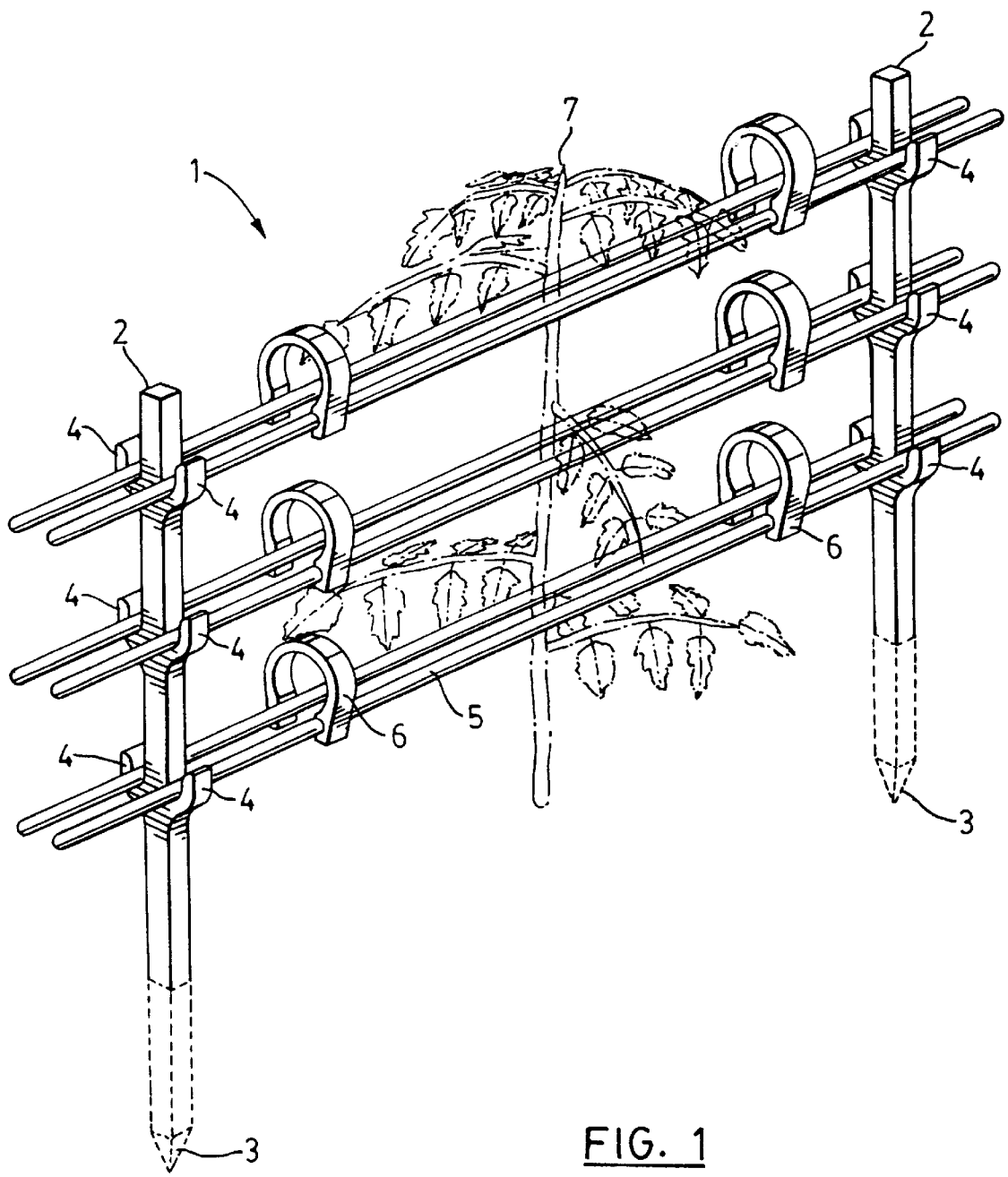
FIG. 1 is a perspective view of the stakes, rods and clips combined in a first embodiment of this invention.
Figure 2:
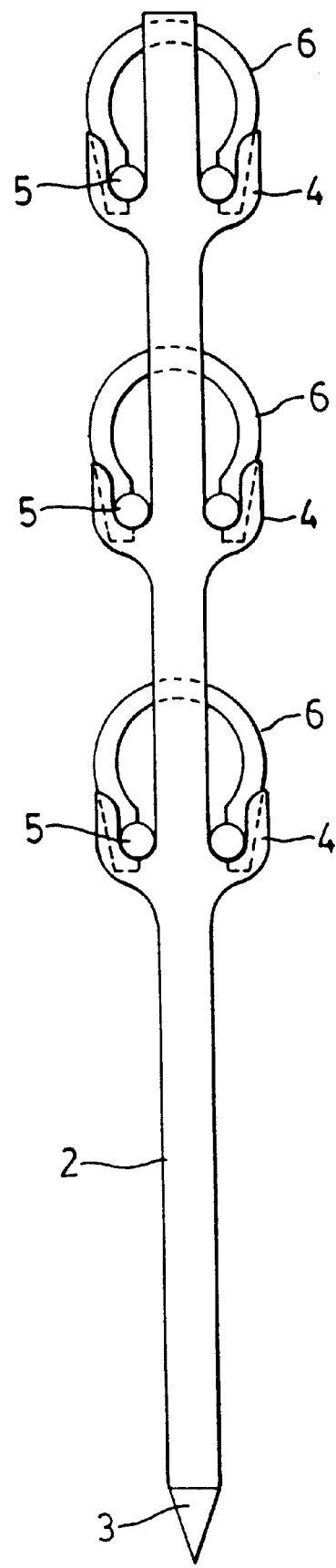
FIG. 2 is an end view of the combination shown in FIG. 1.

FIG. 1 illustrates the first preferred embodiment of the invention 1 comprising a plurality of identical posts 2 which may be driven into the ground by means of pointed ends 3. Each post has a plurality of hooks 4, in pairs, at different heights along the post 2. Between the posts 2 rods 5 clip into the hooks 4 to lie in a horizontal plane at each of the different levels of the hooks. Since the hooks 4 are paired on either side of the post 2 at different levels then a pair of rods 5 may also be found at the corresponding levels. Each pair of rods is connected by C-clips 6 which snap-fit over the rods 5. A plant such as a tomato plant 7 may be supported by the structure by driving the posts 2 on either side of the plant assembling the rods 5 into the hooks 4 on either side of the plant stem 7 and applying the clips 6 to complete the assembly. The C-clips 6 are sufficiently spaced from the rods that it is possible to draw a branch of the plant 7 through the opening of the C-clip for further support of the branches. As the plant grows further rods 5 may be added to the corresponding higher tiers to provide additional support.

Figure 3:
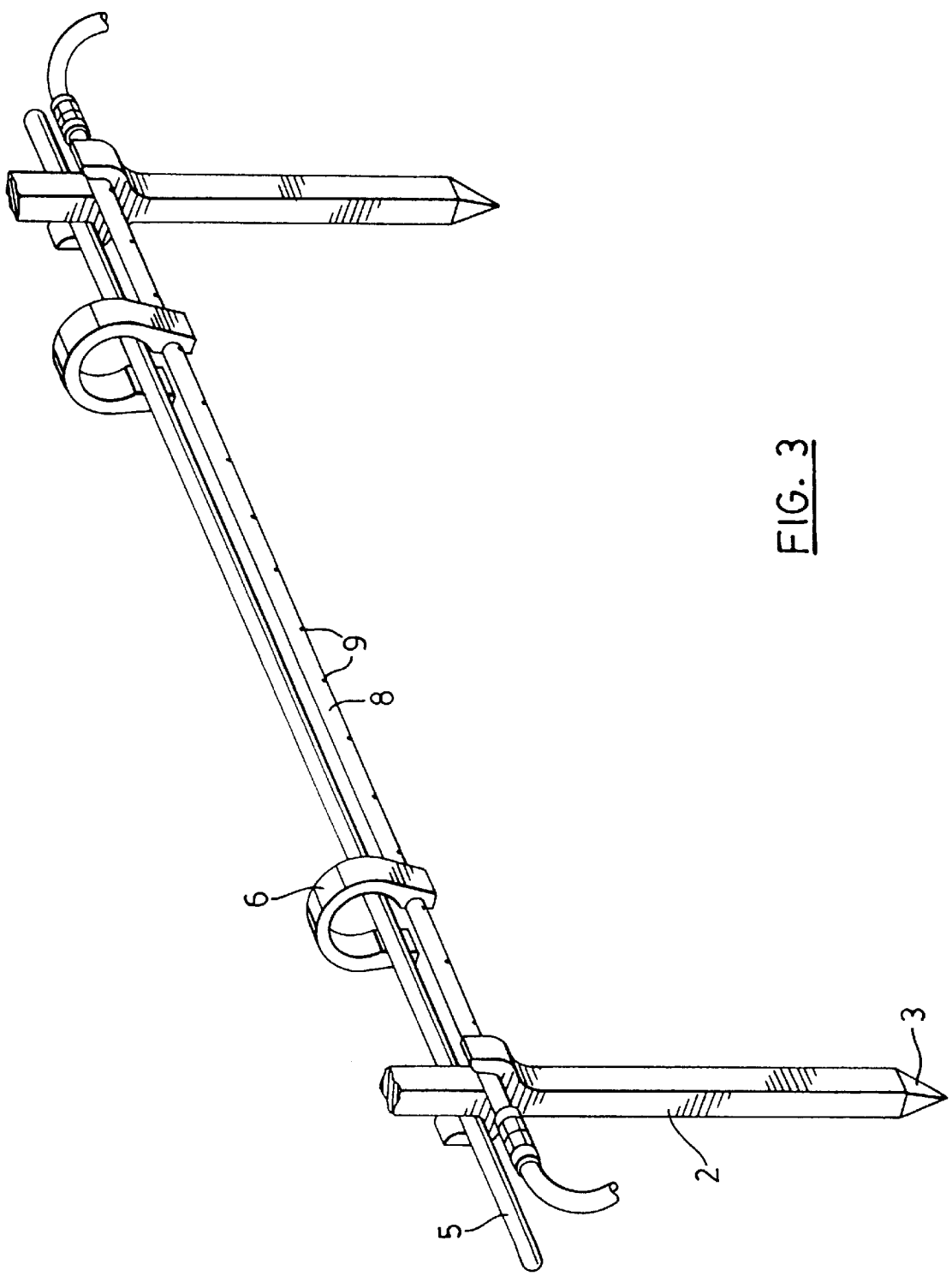
FIG. 3 is a second embodiment having an irrigation system replacing one of the rods.

FIG. 3 illustrates the second embodiment of the invention in which one of the rods 5 is replaced by a water line 8 having spaced holes 9 to permit the plants to be sprayed from time to time as they are growing.

I claim:

1. A plant holder comprising in combination:
   (a) a plurality of identical posts, each said post having,
      (i) a pointed end to facilitate its being driven into the ground to stand upright; and
      (ii) a plurality of pairs of hooks spaced apart at different levels of the post with one hook of every pair on a first side of the post and with another hook of every pair on an opposing second side of the post;
   (b) a plurality of rods of sufficient size to lie in the hooks and to span between adjacent posts, each said rod fitting into a plurality of hooks at the same level of and on either the first side of or the opposing second side of adjacent posts, to lie between upright posts in horizontal parallel pairs of rods at each level of pairs of hooks; and
   (c) a plurality of clips to connect adjacent pairs of parallel rods.

2. The plant holder of claim 1 in which the hooks and rods are sized to snap fit together.

3. The plant holder of claim 1 in which at least one set of rods on one side of said adjacent posts is hollow and has a plurality of holes to act as a water conduit and sprinkler.

4. A plant holder comprising in combination:
   (a) a plurality of identical posts, each said post having
      (i) a pointed end to facilitate its being driven into the ground to stand upright; and
      (ii) a plurality of pairs of hooks spaced apart at different levels of the post with one hook of every pair on a first side of the post and with another hook of every pair on an opposing second side of the post;
   (b) a plurality of hollow rods sized to snap-fit into the hooks and to span between adjacent posts, each said rod fitting into a plurality of hooks at the same level of and on either the first side of or the opposing second side of adjacent posts, to lie between upright posts in horizontal parallel pairs of rods at each level of pairs of hooks; and
   (c) a plurality of C-shaped clips to snap-fit over adjacent pairs of parallel rods and to receive and hold a branch of a plant.

5. The plant support of claim 4 in which one or more rods are hollow and have holes to conduct and sprinkle water over the plant.

* * * * *